July 3, 1928.
O. K. REINHARDT
1,675,382
BATTERY MAKING MACHINE
Filed Aug. 13, 1926    8 Sheets-Sheet 1
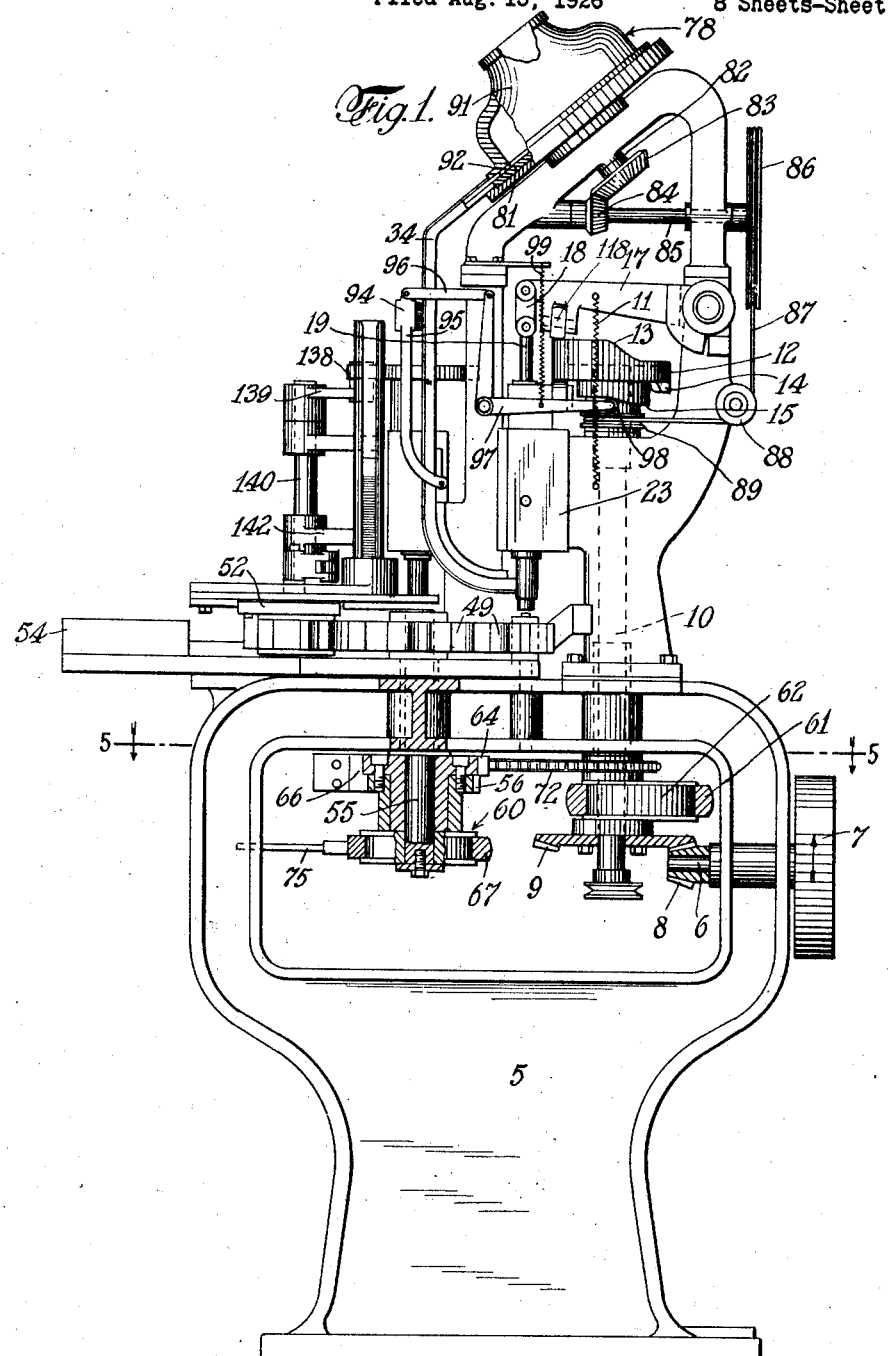
INVENTOR
Otto Karl Reinhardt
BY
Williams & Cross,
ATTORNEYS

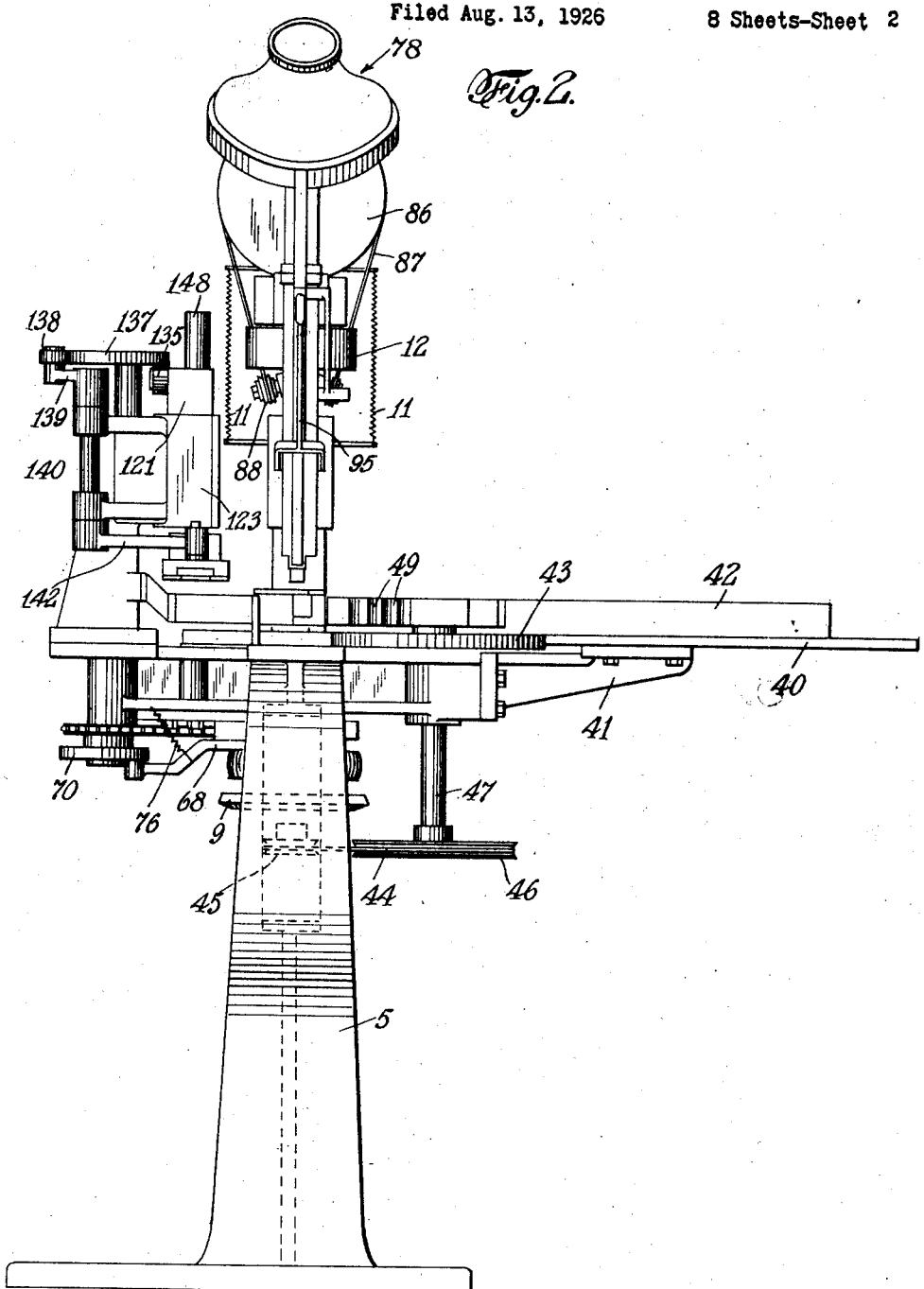

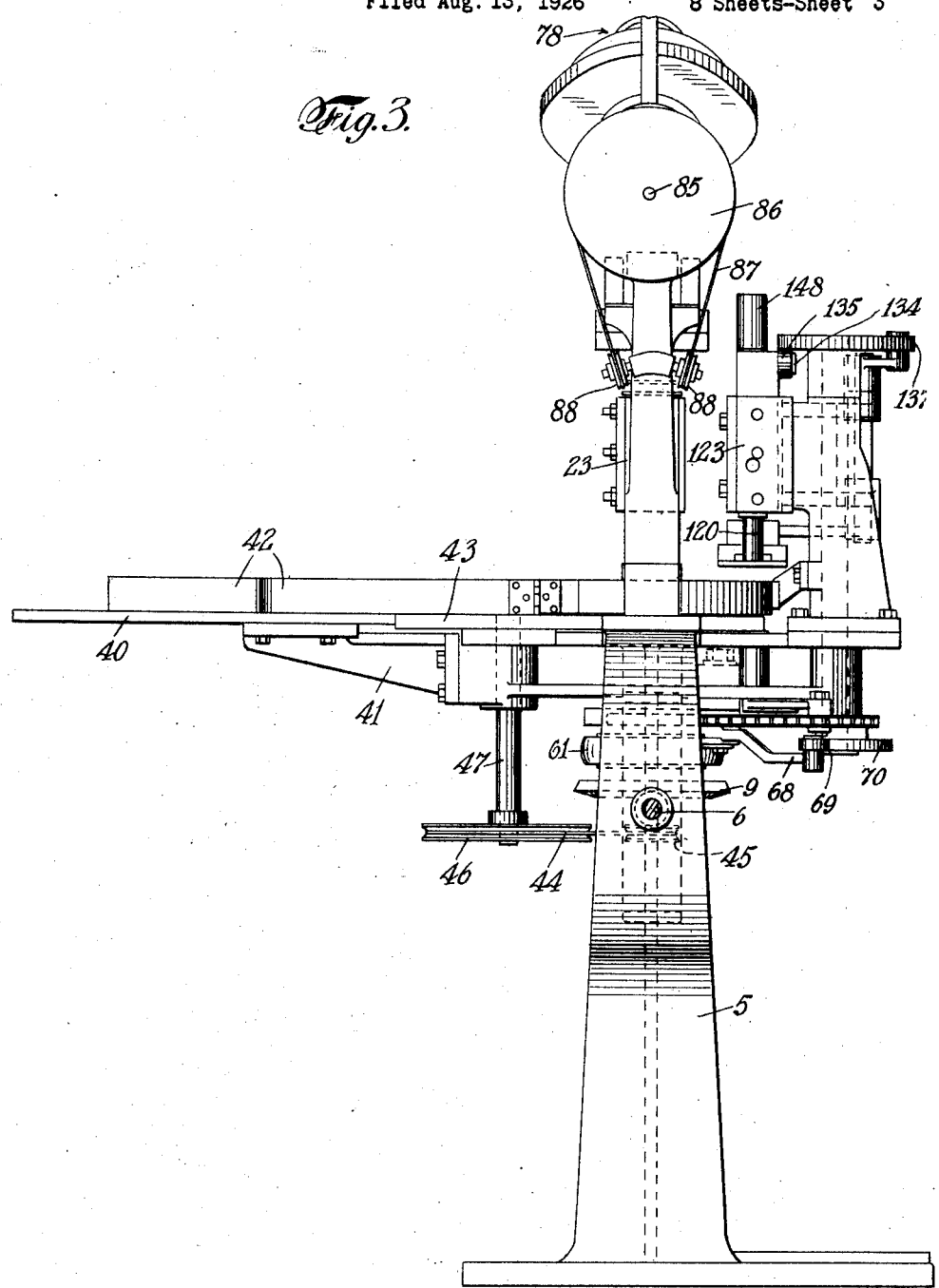

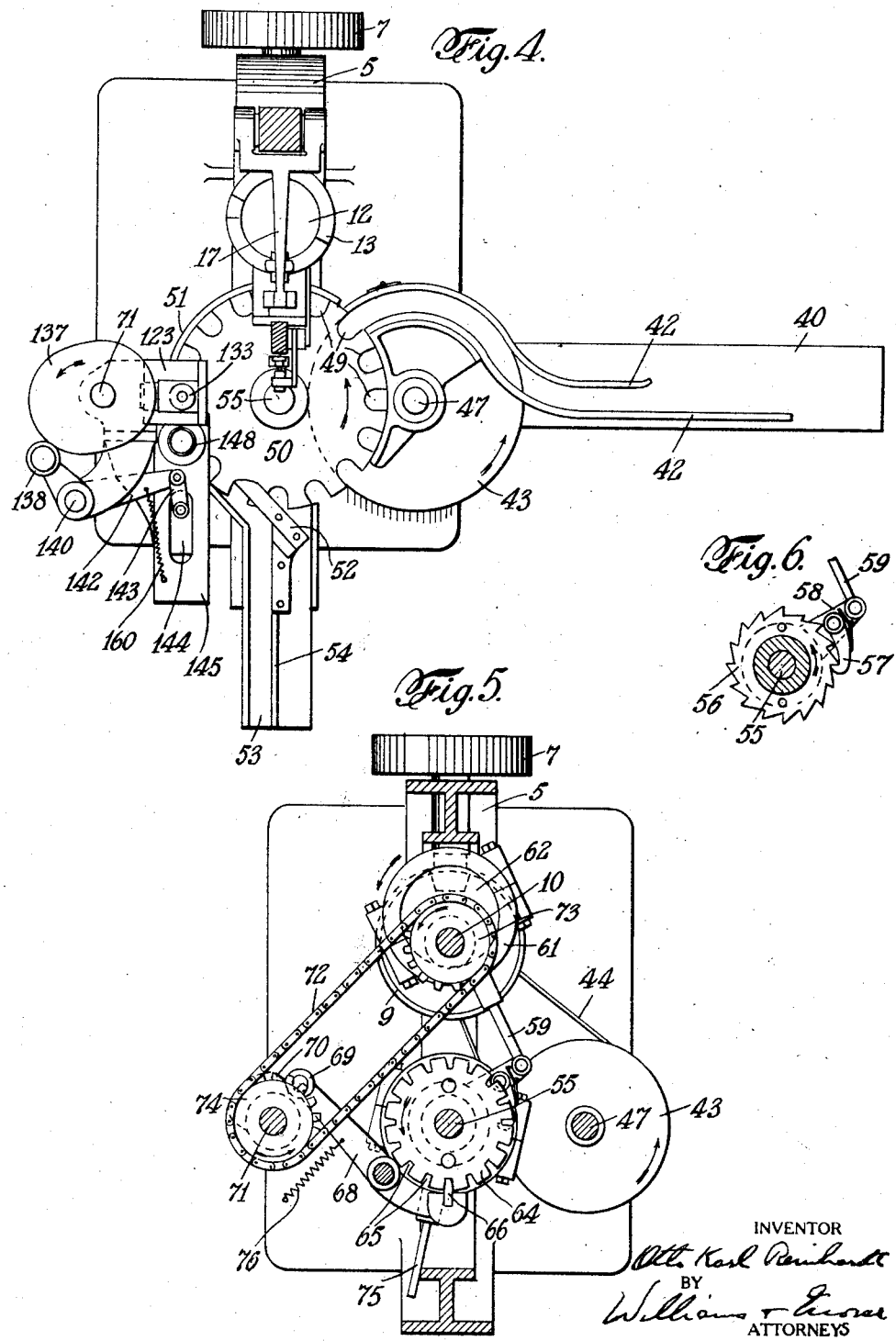

July 3, 1928.
O. K. REINHARDT
1,675,382
BATTERY MAKING MACHINE
Filed Aug. 13, 1926
8 Sheets-Sheet 5
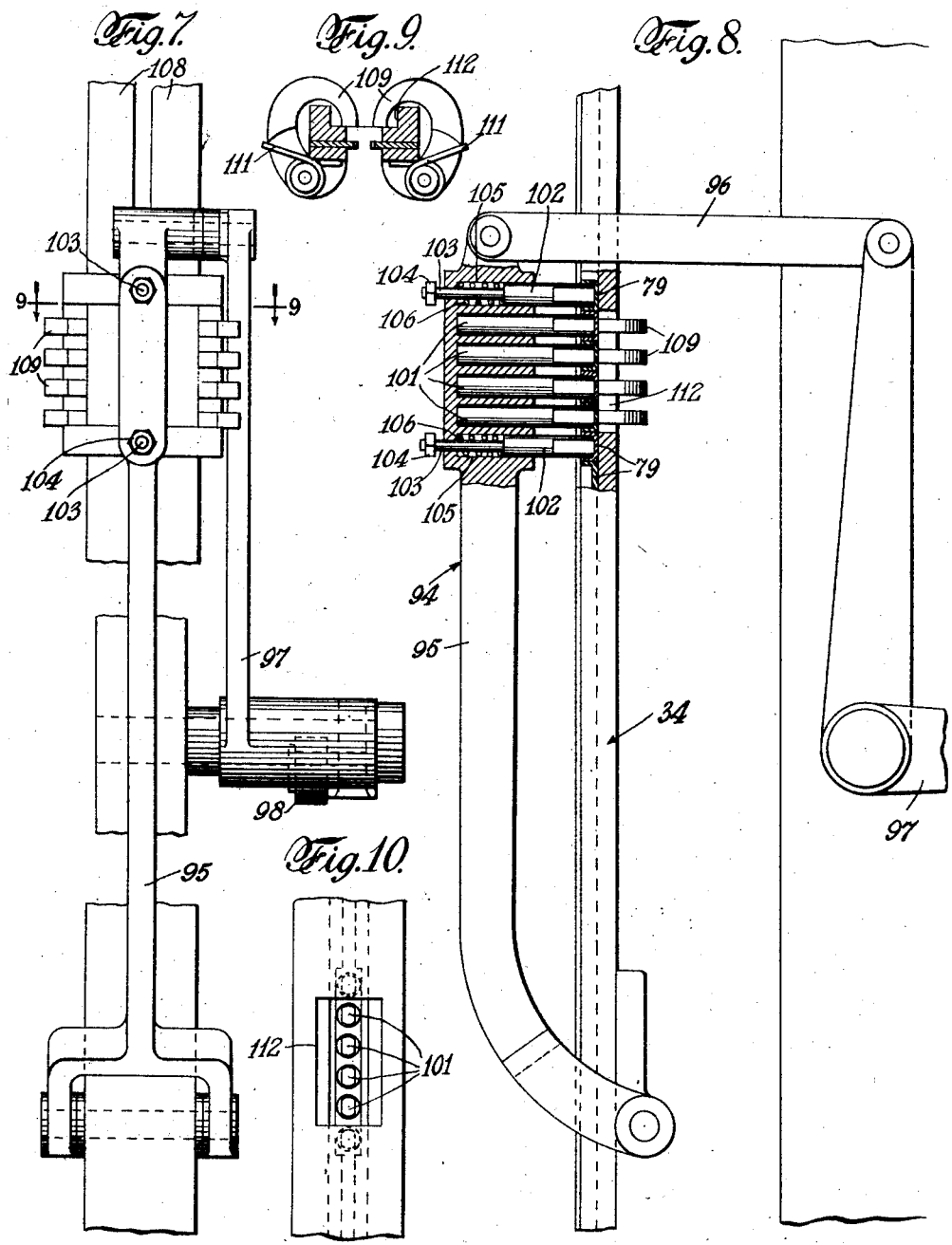

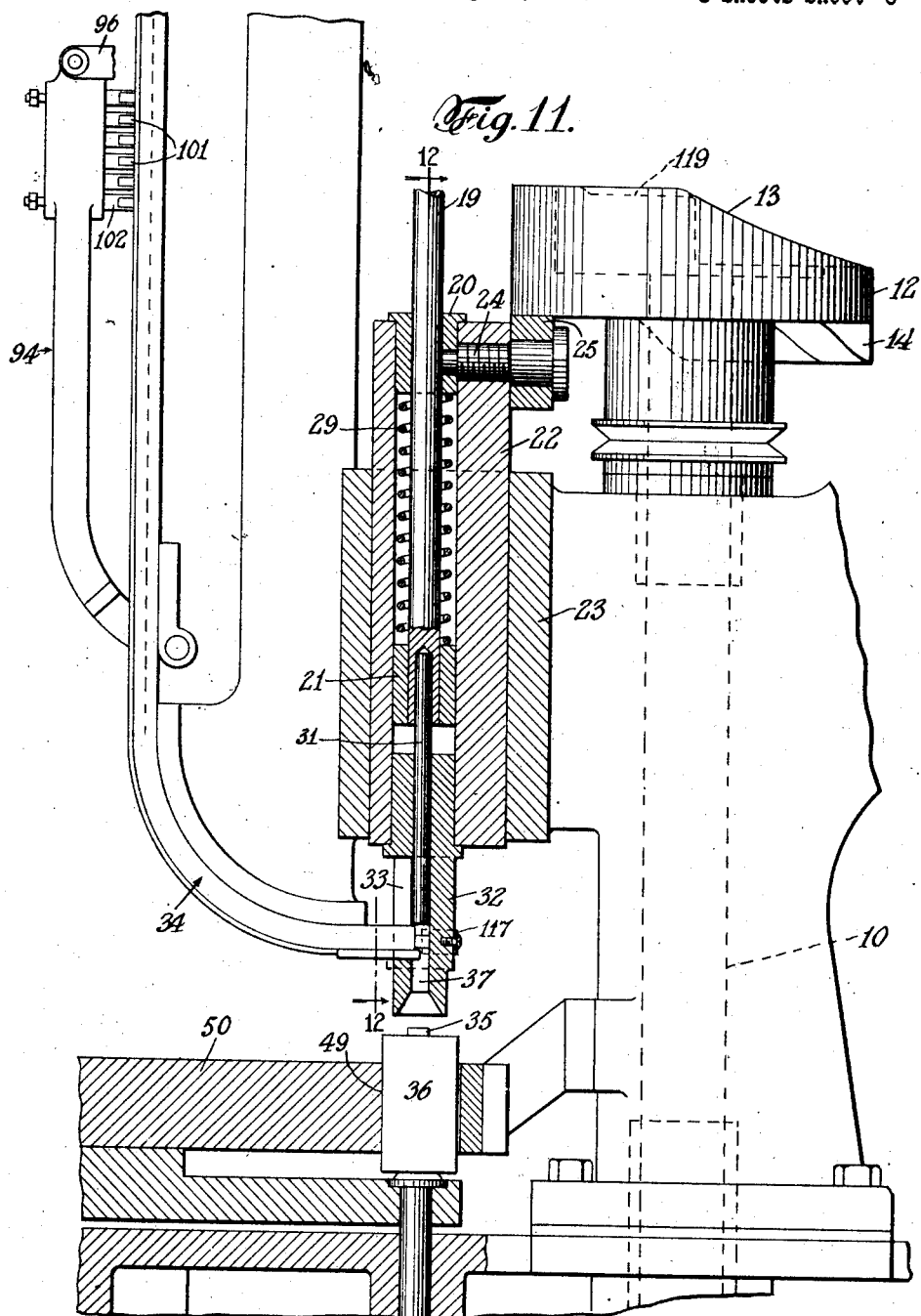

July 3, 1928.

O. K. REINHARDT 1,675,382

BATTERY MAKING MACHINE

Filed Aug. 13, 1926  8 Sheets-Sheet 7

INVENTOR
Otto Karl Reinhardt
BY
Williams & Turney
ATTORNEYS

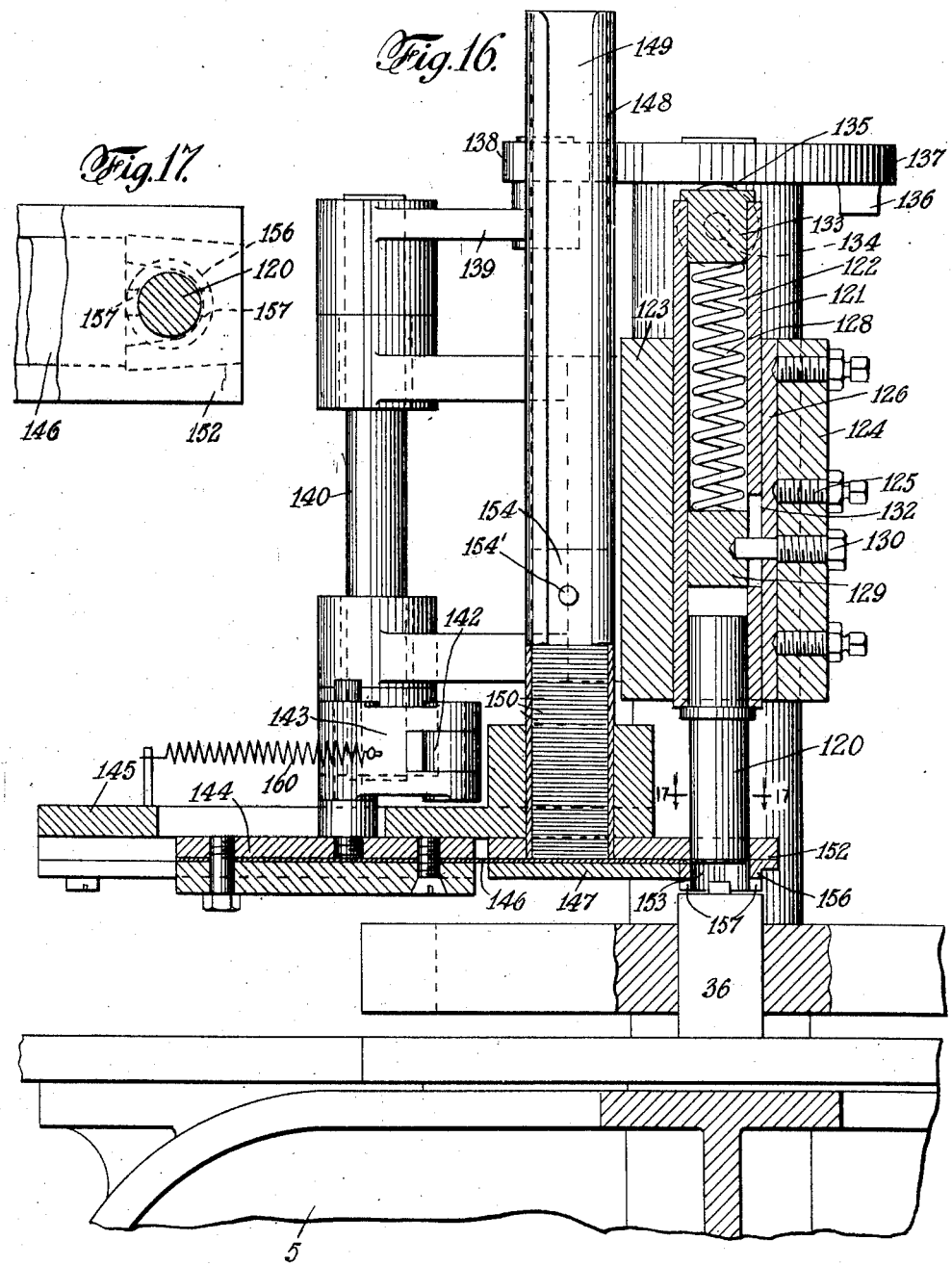

Patented July 3, 1928.

1,675,382

UNITED STATES PATENT OFFICE.

OTTO KARL REINHARDT, OF JAMAICA, NEW YORK, ASSIGNOR, BY MESNE ASSIGNMENTS, TO YALE ELECTRIC CORPORATION, OF NEW YORK, N. Y., A CORPORATION OF DELAWARE.

BATTERY-MAKING MACHINE.

Application filed August 13, 1926. Serial No. 129,099.

This invention relates generally to battery making machines, and its general object is to provide a new and improved automatic machine for applying the usual brass contact cap to the outer or projecting end of the battery electrode, and for inserting into the battery cup, the usual perforated cardboard or other insulating disc which serves to prevent the sealing material from reaching the depolarizing mixture, when such sealing material is poured into the upper end of the cup to seal the same in accordance with usual practice.

Other objects and advantages of the invention will become apparent from the following description when taken in connection with the accompanying drawings in which—

Figure 1 is a view in elevation of the machine as seen from the right in Figure 2 with the feed table removed and certain other parts in section.

Figure 2 is a view in elevation of the machine as seen from the left in Figure 1.

Figure 3 is a view in elevation of the machine as seen from the rear in Figure 2.

Figure 4 is a plan view of the machine as seen from above in Figure 2 with the cap-delivering-hopper removed and its supporting frame broken away.

Figure 5 is a horizontal sectional view taken on line 5—5 of Figure 1.

Figure 6 is a detail view showing in plan a pawl and ratchet mechanism for intermittently rotating the battery-receiving turret.

Figure 7 is a detail view of the cap-selecting mechanism as seen from the left in Figure 8.

Figure 8 is a view in elevation of the cap-selecting mechanism as viewed from the right in Figure 7, a portion of the chute leading from the cap-delivering-hopper and the upper portion of the arm carrying the ejector plungers being shown in section.

Figure 9 is a horizontal sectional view taken on line 9—9 of Figure 7.

Figure 10 is a fragmental elevation of the chute as viewed from the right in Figure 8 in the vicinity of the ejector plungers, the retaining guards being removed.

Figure 11 is a view partly in section and partly in elevation showing a combined electrode-centering and cap-applying means.

Figure 15:
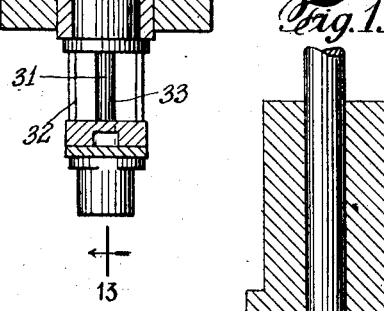
Figure 15 is a vertical sectional view taken on the line 15—15 of Figure 14 and showing a cap in position to be moved, upon initial movement of the cap-applying plunger, into position to be gripped and held by a pair of cap gripping plungers during movement of the cap to cap-applying position.
Figure 14:
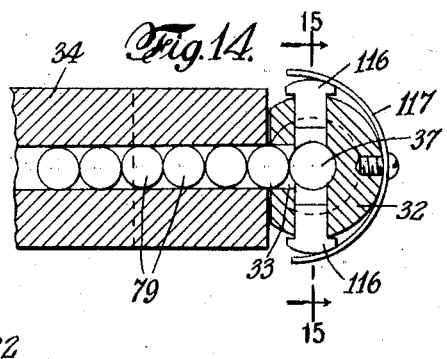
Figure 14 is a horizontal sectional view taken on line 14—14 of Figure 13.
Figure 15A:
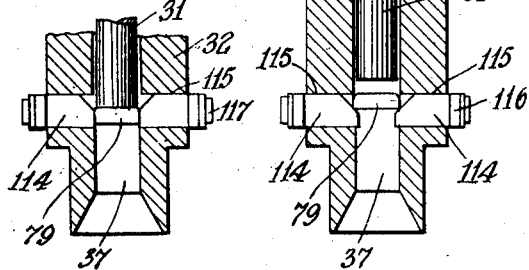

Figure 15$^a$ is a fragmental view similar to Figure 15 and showing the cap as having moved by the cap-applying plunger into position intermediate the cap gripping plungers.

Figure 16 is an enlarged view, partly in section and partly in elevation, showing means for successively inserting perforated insulating discs into the battery cups.

Figure 17 is a horizontal sectional view taken on the line 17—17 of Figure 16.

Figure 12:
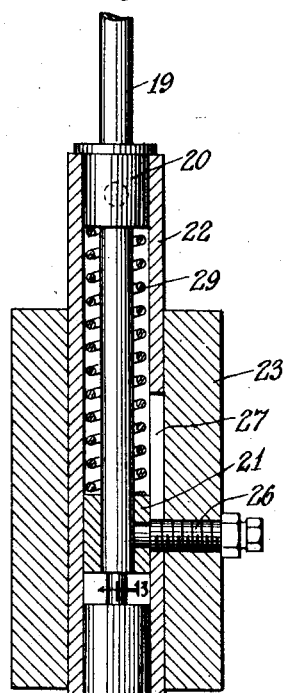
Figure 12 is a vertical sectional view taken substantially on line 12—12 of Figure 11.
Figure 13:
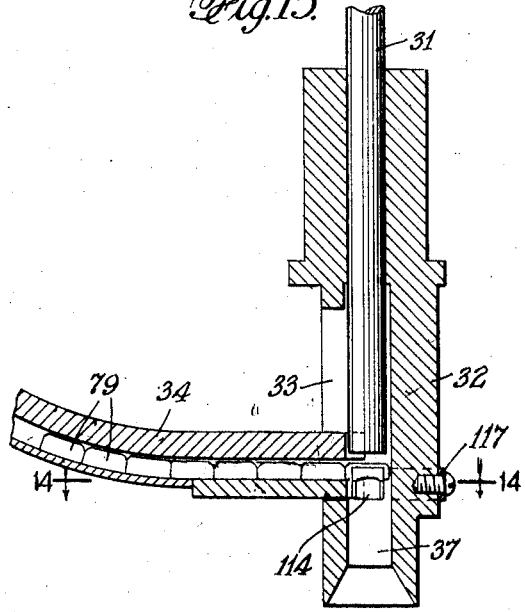
Figure 13 is a vertical sectional view taken on line 13—13 of Figure 12.

The mechanism, embodying the machine herewith shown, is supported upon a suitable frame 5, in which as shown in Fig. 1, is journaled a main drive shaft 6, provided at one end with a pulley 7, adapted for connection with a suitable source of power, not shown, and carrying at its other end a beveled gear 8, meshing with a similar gear 9, carried by a vertically disposed shaft 10, suitably journaled in the frame 5. To the upper end of the shaft 10 is connected a cam-carrying disc 12 with which are associated three cams, 13, 14, and 15, respectively, as shown in Figures 1 and 11. The cam 13 is carried upon the upper side of the disc 12 and is adapted to cooperate with a plunger operating-lever 17, pivotally connected at one end to the frame 5 and provided at its other end with a link 18 which is pivotally connected to an operating rod 19. This operating rod 19 is adapted for vertical reciprocation within bushings 20 and 21, as shown in Figures 11 and 12, located within a reciprocating head 22, adapted for vertical movement within a suitable housing 23 carried by the frame 5. The bushing 20 is fixed with respect to the head 22, it being secured therein by means of a screw-threaded trunnion 24, upon which is journaled a roller 25, adapted to cooperate with the cam 14. The lower bushing 21 is retained against longitudinal movement with respect to the housing 23 by means of a lag screw 26, having screw-threaded engagement with the housing 23 and projecting through an elongated slot 27 formed in the head 22. A compression spring 29, which is arranged within the head 22, and surrounds the operating rod 19, abuts the bushings 20 and 21. This compression spring 29 exerts an upward thrust at all times upon the bushing 20 and serves to lift the head to its position shown in Figure 11 upon disengagement of the cam 14 from the roller 25. A cap-applying plunger 31 is suitably connected to the lower end of the operating rod 19 and is adapted to reciprocate through a centering head 32 carried by the reciprocating head 22. This centering head 32 projects an appreciable distance below the lower end of the reciprocating head 22 and is cut away at one side, thus providing a slot 33 adapted to accommodate a cap-delivering chute 34, hereinafter more particularly described. In order to insure proper alignment of the electrodes 35 with the cap-applying-plunger 31, as the batteries 36 are progressively moved into cap-receiving position, the central passage 37 of the centering head 32 is flared at its lower end as shown in Figures 11, 13 and 15.

The batteries 36, embodying the usual central electrode 35 to which the caps are to be applied, are fed by hand along a table 40 suitably supported from the frame 5 by means of a bracket 41, the batteries entering between a pair of guides 42 and passing on to a continuously rotating feed disc 43 which is operatively connected with the shaft 10 by means of a belt 44, passing over pulleys 45 and 46, carried respectively by the shaft 10 and a shaft 47, to the latter of which the disc 43 is secured. By reason of the fact that the disc 43 is rotated in the direction of the arrow shown therein in Figures 4 and 5, the batteries 36 are urged from between the guides 42 into pockets 49, formed in the periphery of an intermittently actuated turret 50, which is adapted to be rotated in the direction of the arrow shown thereon in Figure 4. This intermittently actuated turret 50 is partially surrounded by a guide 51 which serves to prevent the batteries from becoming dislodged from the time they enter the turret from between the guides 42 until they are cammed out of their respective pockets by means of a finger 52 which directs them into a delivery trough 53, one side of which is a continuation of the guide 51 and the other side of which is formed by an upstanding rib or the like 54.

To the shaft 55 that carries the turret 50, is connected a ratchet wheel 56 which is adapted to be engaged by a spring pressed pawl 57 carried by an oscillating arm 58 suitably journaled to the shaft 55. This arm 58 is connected by a link 59 to a yoke 61, journaled upon an eccentric 62 which is carried by the shaft 10. As the shaft 10 is continuously rotated, intermittent movement is imparted to the shaft 55 and likewise to the turret 50.

A suitable continuously acting brake 60 may be associated with the shaft 55 in order to absorb the momentum of the turret 50 as this turret is intermittently actuated. The brake 60 includes a brake arm 63, carrying a friction brake band 67, from which extends an arm 75, adapted to engage the frame 5 and thereby retain the brake band stationary.

In order to positively lock the turret 50 in proper position when at rest, an intermittently actuated locking mechanism is provided, such mechanism being shown most clearly in Figure 5. This locking mechanism includes an indexing disc 64, connected to the shaft 55 and provided on its periphery with a plurality of notches 65, corresponding in number to the number of pockets 49 in the periphery of the turret 50. A stop lug 66 is adapted to enter one of the notches 65 upon completion of each forward movement of the ratchet wheel 58 in the direction of the arrow shown thereon in Figure 6 and is adapted to be removed from such notch immediately prior to the forward movement of the ratchet 56 in the direction of the arrow shown thereon in Figure 6. This stop lug 66 is carried by an arm 68, pivotally connected intermediate its end to the frame 5 and carrying at one end a roller 69 adapted to cooperate with a cam 70, carried by a vertical shaft 71 which is driven through the instrumentality of a sprocket chain 72, passing over sprockets 73 and 74, carried, respectively, by the shaft 10 and the shaft 71. The cam 70 positively lifts the locking lug 66 out of its notch 65 at the proper instant to permit the ratchet wheel 56 to move forward in the direction of the arrow shown thereon in Figure 6, and a suitable tension spring 76, anchored at one end to the frame 5 and at its other end to the lever 68 intermediate its point of connection with the frame 5 and the roller 69, is employed to move the locking lug 66 into its registering notch immediately after completion of a forward movement of the ratchet wheel 56 in the direction of the arrow shown thereon in Figure 6.

Upon the frame 5, at the top of the machine, is located an inclined cap-delivering-hopper 78, adapted for the reception of a quantity of cup-shaped caps 79 to be delivered through the chute 34 to the centering head 32 and to be there applied to the electrodes 35 as the batteries move progressively through the machine. This hopper 78 includes an inverted bell 91 and a disc 81, the latter being secured to an inclined shaft 82, carrying a bevelled gear 83, meshing with a similar gear 84, carried by a shaft 85, to which is connected a grooved pulley 86, adapted to be driven through the instrumentality of a suitable belt 87, passing over idlers 88 and a grooved pulley 89, carried by the shaft 10. The inverted bell 91, the upper end of which is open, is carried by the disc 81 and is spaced therefrom, by means of suitable spacers 92, a distance slightly greater than the depth of a cap 79. As the disc 81 is rotated, the caps therein are subjected to more or less agitation, as a result of which they pass through the spaces afforded between the disc 81 and the bell 91 of the hopper and enter the upper end of the chute 34, through which they pass by gravity to the centering head 32 to be there applied to the electrodes 35 as the batteries 36 progress intermittently through the machine.

In order to insure entrance to the caps 79 into the centering head 32 with their open ends down, a suitable cap-selecting mechanism 94 is provided intermediate the hopper 78 and the centering head 32. This selecting mechanism 94 includes a reciprocating arm 95, pivotally connected at its lower end to the chute 34 and connected at its upper end by a link 96 to a bell-crank lever 97, pivoted to the frame 5 and carrying at one end a roller 98, adapted to engage and cooperate with the cam 15 against which it is held by means of a tension spring 99 suitably anchored to the frame 5. At the upper end of the arm 95, is carried a plurality of rigid ejector plungers 101 and a pair of spring pressed indexing plungers 102, having stems 103, projecting through the arm 95 and carrying at their outer ends suitable stops, such as nuts or the like 104. These indexing plungers 102 are adapted to move within their respective pockets 105 and are normally urged toward the chute 34 by compression springs 106, carried within the pockets 105 and engaging the plungers 102. All of the plungers 101 and 102 are flattened at diametrically opposed points, as shown most clearly in Figures 8 and 10, so that they may operate within the space afforded between cover strips 108 carried by the front of the chute 34, which space is slightly less than the diameter of the caps 79. For each of the ejector plungers 101, there is provided a pair of yoke-shaped cap-retaining guards 109 which are pivotally connected to the sides of the chute 34 and are retained in their normal positions, shown in Figure 9, by means of torsion springs 111.

These retaining guards partially encircle the sides of the chute 34 and are maintained, by the springs 111, normally in engagement with the back of such chute adjacent an elongated opening 112 formed therein, as shown in Figures 9 and 10. All of the plungers 101 and 102 are properly spaced, their spacing being dependent upon the diameter of the caps 97, and are adapted to enter the caps, if such caps are properly positioned as shown in Figure 8, successively as the arm 95 is moved back and forth through the instrumentality of the bell-crank lever 97 which cooperates with the cam 15. If a cap should be delivered from the hopper 78 to the chute 34 in a position opposite to that of the caps shown in Figure 8, the bottom of such cap, as the arm 95 moves toward the chute 34, will first be engaged by the plunger 102 which will yield against the spring 106 without damaging the selecting mechanism 94 or any other part of the machine. As the caps continue to move down to the chute 34, due to their being applied one-by-one to the electrodes 35 as the batteries 36 proceed through the machine, the cap previously engaged by the plunger 102 will move into a position in front of one of the plungers 101 as these plungers are retracted, and upon the next forward movement of the arm 95 the bottom of the inverted or improperly positioned cap will be engaged by one of the plungers 101 and since these plungers are not adapted to yield, the improperly positioned cap will be ejected through the opening 112 against the influence of the retaining guards 109. For each reciprocation of the cap-applying plunger 31, the arm 95 undergoes one complete cycle of operation. In view of this relation of timing between the cap-applying-plunger 31 and the oscillating arm 95, and in view of the number of plungers 101 employed, the possibility of delivering an improperly positioned cap from the chute 34 to the centering head 32 is obviated.

As the caps 79 are delivered to the centering head 32, they are positioned below the cap-applying-plunger 31 upon the inclined faces of cap-gripping-plunger 114, slidingly mounted within diametrically opposed openings 115, formed in the centering head 32. These cap-applying plungers 114 are grooved at their inner ends to conform with the peripheral contour of the cap 79, as shown most clearly in Figure 13, and are provided at their outer ends with heads 116 which are engaged by a yoke spring 117, secured to the centering head 32. The spring 117, exerting inward thrusts upon the cap-gripping plungers 116, serves to maintain them so positioned that they normally project a slight distance into the central passage 37 of the centering head 32. Preparatory to applying a cap 79 to an electrode 35, the cap is moved from the inclined face of the cap-gripping-plungers 114 into a position intermediate the grooved ends of such plungers. This initial movement of the cap 79 is effected by the plunger 31, which is moved under the influence of a tension spring 11, connected at one end to the operating lever 17 and anchored at its other end to the frame 5, as the roller 118 carried by the arm 17 drops from the high part of the cam 13 on to the adjacent relieved portion 119. The relieved portion 119 of the cam 13 is just enough below the surface of the high part of the cam 13 to permit the cap-applying-plunger 31 to move a sufficient distance to force the cap from its position shown in Figure 15 to its position shown in Figure 15ª. Immediately following this slight movement of the cap-applying-plunger 31, the reciprocating head 22 is moved against the influence of the spring 29 by the cam 14, with the result that the centering head 32 moves down over the electrode 35 carrying with it the cap 79 which is gripped by the cap-gripping-plungers 114, as shown in Figure 15ª. After the centering head 32 has completed its downward movement and the cap 79, carried intermediate the cap-gripping plungers 114, has been thus moved to cap-applying position, the cam 13 releases the arm 17 whereupon it is suddenly moved under the influence of the spring 11 and thereby further moves the plunger 31 into engagement with the cap 79, which is positioned as shown in Figure 15ª, and forces it on to the upper or projecting end of the electrode 35. After the cap 79 has been applied, cams 13 and 14 cooperate respectively with rollers 118 and 25 to lift the plunger 31 and the reciprocating head 22 to their respective positions, shown in Figure 11, preparatory to capping the electrode 35 of the next battery 36 to be brought into cap-receiving position by the intermittently actuated turret 50.

Following the application of a cap 79, to an electrode 35, as above explained, the battery is moved intermittently by the turret 50 to the position shown in Fig. 16, in which position a perforated disc of suitable insulating material, such as cardboard, is inserted into the battery cup and positioned about the projecting electrode. The disc inserting mechanism, shown most clearly in Figs. 1, 2, 4 and 16 includes a disc applying plunger 120 suitably connected to the lower end of a reciprocating block 121, preferably square in cross section, and having a central chamber 122 formed therein. The reciprocating block 121 is carried within a suitable housing 123 supported by the frame 5, the housing being provided with a removable cover plate 124; carrying a plurality of lag screws 125 which engage a wear compensating plate 126, arranged intermediate the reciprocating block 121 and the cover plate 124. By means of the lag screws 125, the wear compensating plate 126 may be adjusted with respect to the reciprocating block 121, so that smooth operation of the reciprocating block 121 within the housing 123 may always be insured. Within the chamber 122, is arranged a compression spring 128, one end of which engages an abutment 129, anchored with respect to the housing 123 by means of a lag screw 130 which projects through the cover plate 124 and an elongated slot 132 formed in the wall of the reciprocating block 121. The spring 128 is seated upon the abutment 129 and also engages a similar abutment 133 connected to the upper end of the reciprocating block 121 by a trunnion 134, carrying a roller 135. This roller 135 is adapted to cooperate with a suitable cam 136 carried upon the lower face of a horizontally disposed cam 137 secured to the shaft 71. The cam 137 is adapted to cooperate with a roller 138, carried by an arm 139 secured to a vertically disposed shaft 140, suitably journaled to the frame 5 and provided at its lower end with an arm 142. The arm 142 is connected by means of a link 143 to a reciprocating slide 144, adapted to operate in a horizontal plane within a housing 145, suitably supported by the frame 5. The slide 144 carries an ejector tongue 146 which is adapted to reciprocate, as the slide 144 is moved back and forth, within a suitable guide or housing 147. Above the ejector tongue 146, is suitably supported a vertically disposed magazine 148, provided at one side with an elongated slot or opening 149 and adapted for the reception of a plurality of perforated discs 150 which are transferred one-by-one from the lower end of the magazine to a disc-receiving-housing 152, through an opening 153 in which the plunger 120 is adapted to reciprocate. This opening 153 is of such a diameter with respect to the diameter of the discs 150 that such discs are adapted to snugly fit the inner wall of the housing 152 and exert a sufficient pressure thereon to prevent their being unduly displaced until such time as they are forced down through the opening 153 and into the battery by the disc-applying-plunger 120. In order to insure proper downward movement of the perforated discs 150 as they are extracted one-by-one from the magazine 148, a suitable weight 154, may be carried within the magazine 148, the weight being provided with a handle or extension 154' which projects through the elongated slot or opening 149 so that the weight may be easily removed when it is desired to replenish the supply of discs. In order that the batteries may progressively move into and out of disc-receiving-position without being obstructed in such movement, the depending shirt 156, of the housing 152 through which the plunger 120 reciprocates, is provided diametrically with notches or openings 157 to accommodate the upper or projecting ends of the electrodes 35 as the batteries progress through the machine.

While the plunger 120 is retained in its uppermost position by the compression spring 128, the slide 144 is moved forward by the cam 137 and as a result of this forward movement the lowermost disk 150 is moved by the ejector tongue 146 into the housing 152 directly over the electrode 35 of the battery which is at rest in disc-receiving-position, as shown in Fig. 16. After the disc has been so moved by the ejector tongue 147 and upon continued rotation of the cam 137, the cam 136 is brought into engagement with the roller 134, whereupon the block 121 with its associated plunger 120 is moved down against the influence of the spring 128, thereby forcing the disk, previously transferred from the magazine 148 to the housing 152, down around the electrode 35 and into the battery cup. Upon continued rotation of the cam 137, a tension spring 160, connected to the arm 142 and the housing 145, serves to retract the slide 144, thereby moving the ejector tongue 146 to the left as viewed in Fig. 16, a sufficient distance to permit the lowermost disc 150 to drop from the magazine 148 into position in front of the forward end of the ejector tongue 146, preparatory to transferring this disc to disc-applying position. The timing of the turret 50 with respect to the shaft 71 is such that the cam 136 is released from the roller 134 before further movement of the turret 50 is again begun in the direction of the arrow shown thereon in Fig. 4. As the cam 136 is released from the roller 134, the spring 128 acting against the abutment 133 serves to lift the block 121 and simultaneously move the plunger 120 to its position shown in Fig. 16. After the plunger 120 has been lifted, the turret 50 is again advanced, thereby moving the battery with its inserted disc 150 to its next position of rest and simultaneously advancing the next succeeding battery, to the electrode 35 of which a cap 79 has been applied, to its next position of rest.

The general operation of the machine is as follows:

The batteries are fed by hand from a table 40 into the space between the guides 42 and thence on to the continuously rotating disc 43 from which they are transferred successively into the pockets 44 of the intermittently actuated turret 50. The turret 50 transfers each battery to cap-applying position below the plunger 31, in which position the plunger 31 applies the cap 79 to the upper or projecting end of the battery electrode 35. After the electrode 35 has been provided with a cap 79, the battery is carried by the intermittently actuated turret 50 to disc-receiving position below the plunger 120 in which position it receives a disc 150, such disc being transferred by the ejector tongue 146 from the bottom of the magazine 148 to the housing 152 and there moved down by the plunger 120 over the upper or projecting end of the electrode 35 into the battery cup. After the battery receives its insulating disc 150, it is transferred by the intermittently actuated turret 50 to a position substantially diametrically opposed to that at which it received its cup and is there cammed or forced into a delivery trough 53 by the finger 52, the battery being then in a state of completion ready to receive the usual sealing material which is poured into the battery cup to close the upper end thereof in accordance with usual practice.

Having thus described the invention what is claimed is:

1. A battery making machine having, in combination, means for vertically supporting a battery in disc receiving position with its central electrode exposed, means for feeding a disc into disc-applying position above said electrode, friction means for temporarily retaining said disc in disc-applying position above said electrode, and means for engaging said disc and moving the same into the battery to a position about said electrode.

2. A battery making machine having, in combination, means for moving the batteries into disc-receiving position with their respective central electrodes exposed and projecting upwardly, a magazine adapted for the reception of a plurality of discs, means for removing said discs one-by-one and for transferring the same to disc-applying position above said electrodes, friction means for temporarily retaining said discs in disc-applying position above said electrodes, and means for engaging said discs and moving the same successively into the batteries to a position about the respective electrodes thereof.

3. A battery making machine having, in combination, means for moving batteries successively into disc-receiving position with their respective central electrodes exposed and projecting upwardly, a magazine adapted for the reception of a plurality of discs, a reciprocating ejector tongue for removing said discs one-by-one from said magazine, a disc-receiving housing adapted to receive said discs successively and frictionally retain them temporarily in disc-applying position above said electrodes, and a plunger adapted to engage said discs and move the same successively into the batteries to a position about the respective electrodes thereof.

4. A battery making machine having, in combination, means for supporting a battery in cap-receiving and disc-receiving positions respectively with its central electrode exposed, means for feeding a metallic cap into cap-applying position, means for applying said cap to the exposed end of said electrode, means for feeding a disc into disc-applying position, and means for engaging said disc and moving the same into the battery to a position about said electrode.

5. A battery making machine, having, in combination, means for supporting a battery with its electrode exposed in cap-receiving position, a gripping device adapted to receive and grip a cap to be applied to said electrode, means for moving said gripping device toward said electrode and into cap-applying position, and means for moving said cap with respect to said gripping device and for forcing said cap onto said electrode.

6. A battery making machine having, in combination, means for supporting a battery with its electrode exposed in cap-receiving position, a centering device adapted to receive a cap to be applied to said electrode, a gripping device associated with said centering device and adapted to receive said cap from said centering device, means for moving said centering device and said gripping device with its associated cap toward said electrode, and means for removing said cap from said gripping device and for forcing said cap onto said electrode.

7. A battery making machine having, in combination means for supporting a battery with its electrode exposed in cap-receiving position, a tubular centering device adapted to receive a cap to be applied to said electrode, a pair of gripping plungers associated with said centering device and adapted to support said cap within said centering device, means for transferring said cap from its supported position to a position intermediate said plungers, means for moving said centering device toward said electrode whereby said cap is moved into cap-applying position, and means for relieving said gripping plungers of said cap and forcing the same onto said electrode.

8. A battery making machine having, in combination, means for supporting a battery with its electrode exposed in cap-receiving position, a tubular centering device adapted to receive a cap to be applied to said electrode, yieldable supporting and gripping means for supporting and thereafter gripping said said cap, means for moving said cap from its supported position to a position to be gripped by said gripping means, means for moving said centering device together with said supporting and gripping means toward said electrode whereby said cap is moved into cap-applying position, and means for moving said cap out of its gripped position and for forcing said cap onto said electrode.

9. A battery making machine having, in combination, means for supporting a battery with its electrode exposed in cap-receiving position; a cap-feeding means including a chute having an opening therein; and a cap selecting mechanism for ejecting from the chute such caps as are improperly positioned therein; said cap-selecting mechanism comprising means adapted to engage improperly positioned caps and eject the same from said chute through said opening, and yieldable means adjacent said opening tending to retain within said chute the caps to be ejected and adapted to be moved out of the path of said caps as they are being ejected.

10. A battery making machine having, in combination, means for supporting a battery with its electrode exposed in cap-receiving position; a cap-feeding means including a chute, having an opening therein; and a cap-selecting mechanism for ejecting from the chute such caps as are improperly positioned therein, said cap-selecting mechanism comprising an oscillatory arm, a plunger carried by said arm and adapted to engage an improperly positioned cap and eject the same from said chute through said opening, and a yieldable retaining guard adjacent said opening tending to retain within said chute the caps to be ejected and adapted to be moved out of the path of said caps as they are being ejected.

11. A battery making machine having, in combination, means for supporting a battery with its electrode exposed in cap-receiving position; a cap-feeding means including a chute, having an opening therein; and a cap-selecting mechanism for ejecting from the chute such caps as are improperly positioned therein; said cap-selecting mechanism comprising an oscillatory arm, a plurality of ejector plungers carried by said arm and adapted to engage improperly positioned caps and eject the same from said chute through said opening, and a plurality of spring-pressed retaining guards adjacent said opening tending to retain within said chute the caps to be ejected and adapted to be moved out of the path of said caps as they are being ejected.

12. A battery making machine having, in combination, means for supporting a battery with its electrode exposed in cap-receiving position; a cap-feeding means including a chute, having an opening therein; and a cap-selecting mechanism for ejecting from the chute such caps as are improperly positioned therein; said cap-selecting mechanism comprising an oscillatory arm, a plurality of ejector plungers carried by said arm and adapted to engage improperly positioned caps and eject the same from said chute through said opening, a plurality of spring-pressed retaining guards adjacent said opening tending to retain within said chute the caps to be ejected and adapted to be moved out of the path of such caps as they are being ejected, and a pair of yieldable indexing plungers carried by said arm and adapted to enter such caps as are properly positioned within said chute as they pass therethrough.

In testimony whereof, I have affixed my signature to this specification.

OTTO KARL REINHARDT.